United States Patent [19]

Asakawa et al.

[11] Patent Number: 4,641,915
[45] Date of Patent: Feb. 10, 1987

[54] ROTARY JOINT FOR OPTICAL FIBERS

[75] Inventors: Kenichi Asakawa, Hachioji; Yuichi Shirasaki, Tokyo; Yoshinao Iwamoto, Fujimi, all of Japan

[73] Assignee: Kokusai Denshindenwa Co., Ltd., Tokyo, Japan

[21] Appl. No.: 672,168

[22] Filed: Nov. 16, 1984

Related U.S. Application Data

[63] Continuation of Ser. No. 328,516, Dec. 8, 1981, abandoned.

[30] Foreign Application Priority Data

Dec. 16, 1980 [JP] Japan ................... 55-176568
Dec. 16, 1980 [JP] Japan ................... 55-176569

[51] Int. Cl.$^4$ .............................................. G02B 6/32
[52] U.S. Cl. ........................... 350/96.18; 350/96.20
[58] Field of Search ............. 250/227, 551; 350/3.71, 350/6.4, 6.5, 6.9, 96.15, 96.18, 96.20, 486, 485; 384/446, 519, 518, 616, 620

[56] References Cited

U.S. PATENT DOCUMENTS

| | | | |
|---|---|---|---|
| 3,829,195 | 8/1974 | Rawson | 350/96.15 |
| 3,922,063 | 11/1975 | Marrone | 350/96.15 |
| 4,124,272 | 11/1978 | Henderson et al. | 350/96.21 |
| 4,249,794 | 2/1981 | Haley | 350/96.20 |
| 4,367,040 | 1/1983 | Goto | 356/44 |
| 4,378,144 | 3/1983 | Duck et al. | 350/96.18 |
| 4,398,791 | 8/1983 | Dorsey | 350/96.18 |
| 4,438,987 | 3/1984 | Kapaan | 308/10 |
| 4,447,114 | 5/1984 | Koene | 350/96.20 |
| 4,492,427 | 1/1985 | Lewis et al. | 350/96.20 |

FOREIGN PATENT DOCUMENTS

| | | |
|---|---|---|
| 2916763 | 10/1979 | Fed. Rep. of Germany ... 350/96.21 |
| 3007483 | 9/1981 | Fed. Rep. of Germany ... 350/96.20 |

*Primary Examiner*—William L. Sikes
*Assistant Examiner*—Frank González

[57] ABSTRACT

A rotary joint for optical fibers consists of two rotary members which enable efficient transmission of optical signals without the need of converting the same into electric signals by attaching rod lenses having a refractive index in the second order distribution relative to its center axis, to respective tips of the optical fibers capable of relative rotation so that an optical signal emitted from the tip of one optical fiber is transmitted from the end of one rod lens in the form of parallel rays to the other rod lens, and as a converged beam to the tip of the other optical fiber. The joint further includes a mechanism for imparting pressure to the rotary members, and a mechanism for finely setting the angle between the two rod lenses.

4 Claims, 18 Drawing Figures

ROTARY JOINT FOR OPTICAL FIBERS

This application is a continuation of application Ser. No. 328,516, filed Dec. 8, 1981, (now abandoned).

BACKGROUND OF THE INVENTION

The present invention relates to a rotary joint for optical fibers conveniently used on winding drums for a composite cable which connects the mother ship and the machines for underwater operations.

Figure 1:
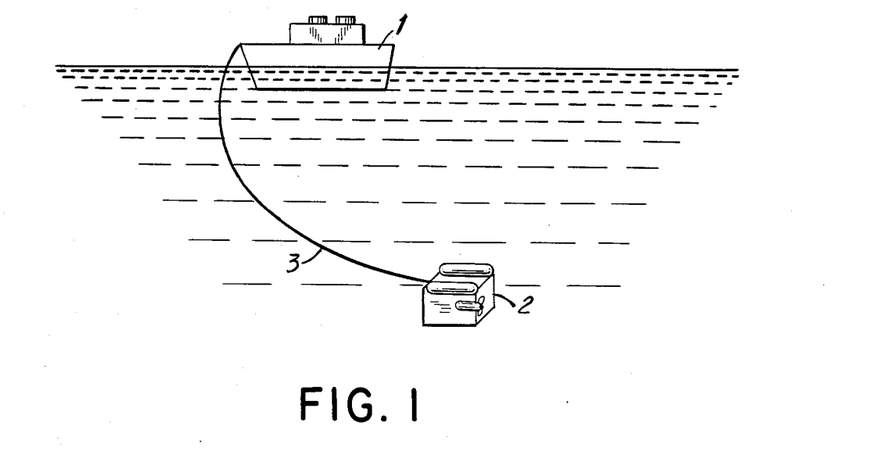
FIG. 1 illustrates a composite cable for machines for underwater operations, an example application of the present invention.

The optical communication technique using optical fibers has recently shown a remarkable progress and it has been put to practical applications in various fields. As an example of such uses, there is a signal transmission means to transmit signals in the composite cable 3 which connects the mother ship 1 and the machine 2 for underwater operations with the power supplied from the ship 1 (FIG. 1). The composite cable 3 consists of a power transmission line, a signal transmission line and a tension member. Introduction of optical transmission system using optical fibers would eliminate the influence of electromagnetic induction from the power transmission line heretofore encountered in the electrical transmission system. The optical system would also reduce the mechanical impact on the machine 2 for underwater operations as the composite cable 3 can be reduced in its diameter and weight. Further, the system has a wider frequency band which is necessary for transmitting picture signals. There are however several technical inadequacies at present as to the use of optical fibers in composite cable 3. For example, no rotary joint for optical fibers has yet been developed. The composite cable must be wound in and out each time the mother ship moves during underwater oprations, and for this reason, the composite cable is usually wound by means of a drum which is easier to handle. The power or signal is transmitted via a slip ring which rotates interlockingly with the drum between the composite cable at the mother ship and the composite cable in the water. In the case of a composite cable using the optical fiber transmission system, since no rotary joint for optical fibers usable as a counterpart of the electrical slip ring has been developed, the optical signals must first be converted to electric signals to be passed through the slip ring before converted to optical once again. However, the electromagnetic induction from the power transmission line tends to affect as the signals are converted to electric signals in this system. And moreover, when the frequency band of the signals is wider, a special slip ring must be used. These defects offset the features of optical fibers.

SUMMARY OF THE INVENTION

The present inventon aims to provide a rotary joint for optical fibers which is capable of transmitting optical signals without converting the same into another medium at a rotary junction of the optical fiber transmission channel. In order to achieve this, an object of the present inventon is consisted of the following: a rotary member where a portion retaining one optical fiber is made rotatable coaxially and in relation with the portion retaining the other optical fiber, and; an optical system which converts the light emitted from one of the optical fibers to be transmitted to the other optical fiber into rays parallel to the rotary axis of the rotary member.

Another object of the present invention is to provide a rotary joint for optical fibers which transmits optical signals as they are at a rotary junction of the optical fiber transmission channel which is bent at a predetermined angle.

Still another object of the present invention is to provide a rotary joint which transmits optical signals as they are at a rotary junction of the optical fiber transmission channel which is bent and where the direction of the transmission can be reversed.

BRIEF DESCRIPTION OF THE DRAWINGS

FIGS. 3(a) and 3(b) show one embodiment of rotary joint for optical fibers according to the present invention in vertical section to show the rod lenses arranged opposite: in FIG. 3(a), the rod lenses are lineally arranged while in FIG. 3(b), at an angle.

FIGS. 4 through 6(a) show other embodiments of the present invention, showing the rod lenses in opposite arrangement sectioned at the center.

FIGS. 7 through 10 show embodiments of a rotary joint for optical fibers according to the present invention with the rod lenses being arranged to face one direction.

FIGS. 8 through 10 respectively show other embodiments in section at the center.

DETAILED DESCRIPTION OF THE INVENTION

The present invention will now be described in detail with reference to the drawings.

Figure 2A:
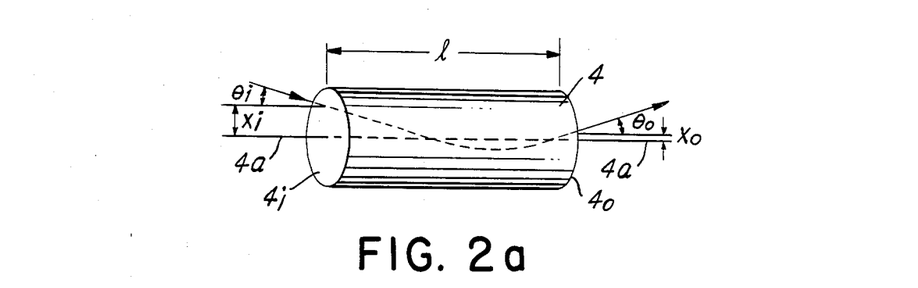
FIGS. 2(a), 2(b) and 2(c) show the rod lens.
Figure 2B:
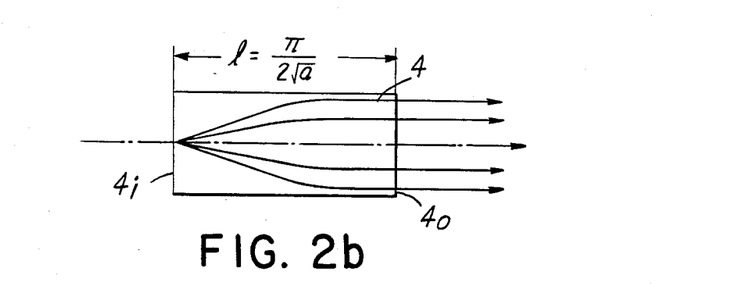
Figure 2C:
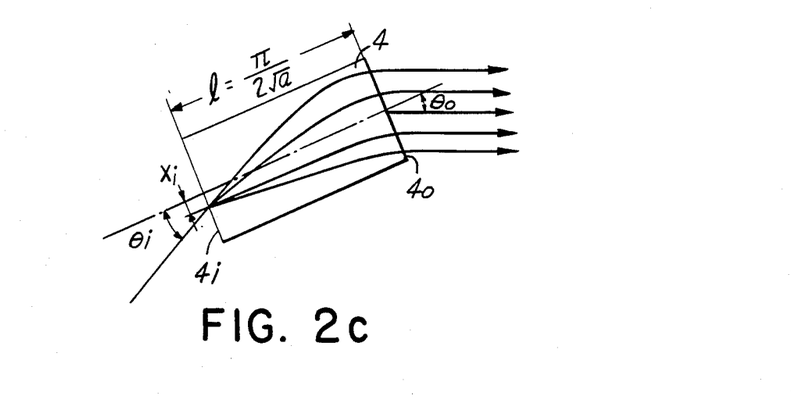

Referring first to FIG. 2, the rod lens is explained which constitutes the optical system indispensable for the rotary joint for optical fibers according to the present invention.

Generally, it is possible to transmit the light even when two optical fibers are closely arranged opposite at their end section, but the core part of the optical fiber where the light is transmitted measures about 50 μm in diameter. Therefore, even a slight axial displacement will result in a marked increase of loss in transmission in case of the rotary joint where the end sections of respective optical fibers rotate in relation with each other. The rod lens to be described hereunder will be effective for overcoming such a defect.

The rod lens 4 is cylindrical in shape and its refractive index distribution in the direction of the radius is to the second order with its center axis 4a as the axis of symmetry. The refractive index is expressed by the following equation(1):

$$n_{(r)} = n_o \left(1 - \frac{a}{2} r^2\right) \tag{1}$$

wherein $n_{(r)}$: refractive index at a point from the center axis 4a in a distance of r.

$n_o$: refractive index at the center axis 4a a: constant

Given the length of the converging lens as l, a relation is established between the position of light $r=X_i, X_o$ at the light incident (i.e. incoming) end section $4_i$ and light excident (i.e. outgoing) end section $4_o$, and the angles $\theta_i$, $\theta_o$ to the center axis $4a$ as expressed by the equation (2):

$$\begin{bmatrix} X_0 \\ \theta_0 \end{bmatrix} = \begin{bmatrix} \cos\sqrt{a}\, l & -\frac{1}{n_0\sqrt{a}}\sin\sqrt{a}\, l \\ n_0\sqrt{a}\sin\sqrt{a}\, l & \cos\sqrt{a}\, l \end{bmatrix} \begin{bmatrix} X_i \\ \theta_i \end{bmatrix} \quad (2)$$

Therefore, suppose the length l of the rod lens 4 is $$\frac{\pi}{2\sqrt{a}},$$

it is given as:

$$\sin\sqrt{a}\cdot l = \sin\frac{\pi}{2} = 1$$

$$\cos\sqrt{a}\cdot l = \cos\frac{\pi}{2} = 0$$

and the position $X_o$ of the light at the light excident end section $4_o$ and the angle $\theta_o$ may be expressed by the equation (3):

$$X_o = -\frac{1}{n_0\sqrt{a}}\cdot\theta_i \quad (3)$$

$$\theta_o = n_0\sqrt{a}\cdot X_i$$

In other words, as shown in FIGS. 2(b) and (c), when the light enters from an arbitrary point $X_i$ of the incident end section $4_i$ of the rod lens 4, it will be radiated in parallel rays at an angle $$\theta_0 = n_0\sqrt{a}\cdot X_i$$

to the center axis $4a$ at the light excident end section $4_o$. When parallel rays enter at an angle $\theta_i$ to the center axis $4a$, they will converge at the points $X_o$ given in the above equation (3) at the excident end section $4_o$. Therefore, if an optical fiber for receiving the light will be attached to the converging points $X_o$ while a rod lens attached with an optical fiber for transmitting the light will be provided at the incident end section $4_i$, optical signals will be efficiently transmitted without contacting to each other.

Figure 3A:
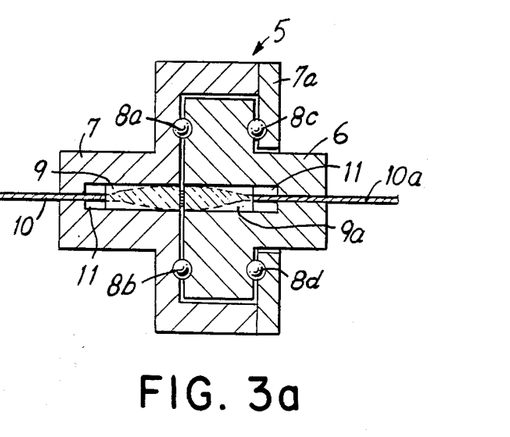
Figure 3B:
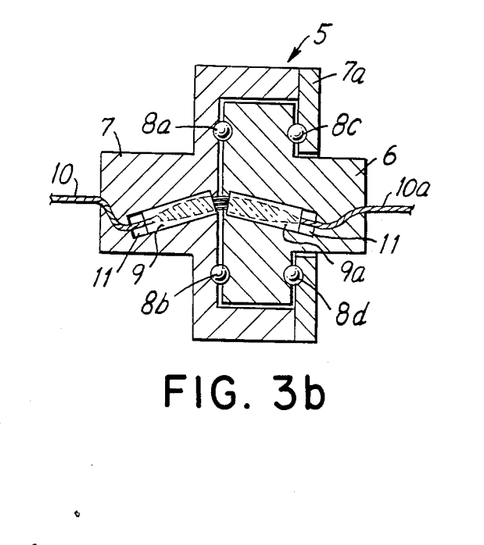

A rotary joint for optical fibers using the rod lenses mentioned above will be explained next. The rotary joint for optical fibers 5 is provided with two opposing rotary members 6, 7. One of the rotary members, 6, is sleeved by the other rotary member 7 and its cover plate 7a, provided with bearings 8a–8d at the front and the rear portions thereof, and supported in a relatively rotatable manner. Rod lenses 9, 9a which constitute the optical system are opposed in the rotary members 6 and 7. Optical fibers 10, 10a are attached to the base section of the lenses 9, 9a respectively and retained in the rotary members 6 and 7. The position of the optical fibers 10, 10a will determine the angle to the center axis of the lenses 9, 9a of the parallel rays passing through the lenses as given in the equation (3). Thus, the two rod lenses 9, 9a will be so fixed that the optical axis of the parallel rays should align with the rotary axis of the two rotary members 6, 7. When optical fibers 10, 10a are attached coaxially with the center axis of the rod lenses 9, 9a, as shown in FIG. 3(a), the center axis of the lenses 9, 9a and the optical axis will coincide, whereby the rotary axes of the rotary members 6, 7 will coincide with these axes. In FIG. 3(b), the optical fibers 10, 10a are not positioned coaxially with the center axis, but the parallel light rays between the rod lenses 9, 9a coincide with the rotary axis. Spaces 11 are provided to facilitate processing.

As the refractive index of the rod lenses 9, 9a is made the second order distribution to the center axis and its length is given as $$\frac{\pi}{2\sqrt{a}},$$

the light emitting from the optical fiber 10 will become parallel rays as they come out of the rod lens 9. The rod lens 9a will converge the rays again to enter the optical fiber 10a. Likewise, the light emitted from the optical fiber 10a will be directed into the optical fiber 10. As the optical axis of the parallel rays passing through the rod lenses 9, 9a coincides with the rotary axis of the rotary members 6, 7, the light may be efficiently transmitted between the two optical fibers 10, 10a irrespective of the rotary angle of the rotary members 6, 7 even when the two members 6, 7 rotate relatively.

A lens about 1 mm in diameter and 10 mm or less in length may be used as the rod lenses 9, 9a. Even when the interval between the lenses 9, 9a is made as large as about 5 mm, the transmission efficiency will not be lowered.

Generally, light emitted from an optical fiber diverges at an angle of about 20°. When the light is transmitted simply by two optical fibers, there will be a considerable loss in transmission. To prevent this, it will be necessary to place the optical fibers at a very close distance while maintaining the axes thereof to coincide. However, use of the rod lens will solve all the problems.

Figure 4:
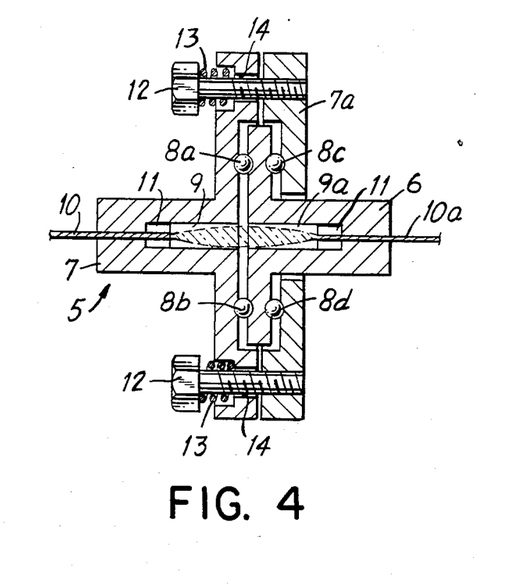

FIG. 4 is a sectional view at the center of another embodiment of the rotary joint for optical fibers according to the present invention.

In this embodiment, the end section of the rod lenses 9, 9a are not inclined, and the light is transmitted under the condition where the optical axes are aligned. One of the rotary members 7 and its cover plate 7a are provided with a pressure adjustment mechanism comprising bolts 12 and coil springs 13 to adjust pressure applied on the bearings 8a–8d. That is, there are provided 4 bolts 12 at an equal interval on the circumference which screw with the cover plate 7a of the rotary member 7. A clearance 14 is made in the rotary member 7, which is made movable along the bolt 12. A coil spring 13 is interposed between the bolt 12 and the rotary member 7, and the bearings 8a–8d are imparted with suitable pressure by means of the spring. The remaining construction is identical with the embodiment in FIG. 3(a), but it may be constructed as the one shown in FIG. 3(b). The number of bolts and coil springs may be arbitrary instead of 4.

Figure 5A:
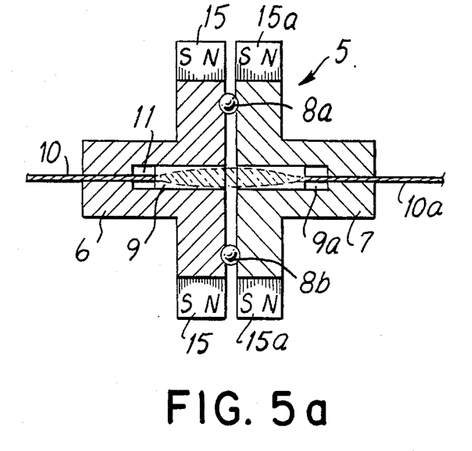
Figure 5B:
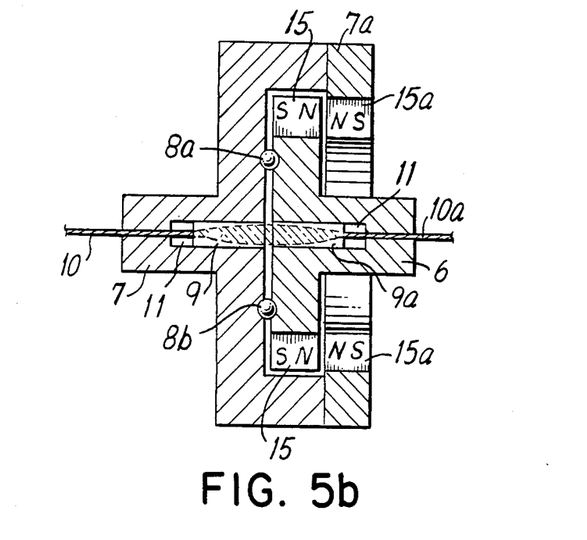

Referring now to FIGS. 5(a) and 5(b), still another embodiment will be explained.

Like the embodiment in FIG. 4, the bearings 8a and 8b are imparted with suitable pressure in order to prevent the end section of the rod lenses 9, 9a from tilting to disarrange the alignment of the optical axes by the use of permanent magnets 15, 15a.

In FIG. 5(a), the circular permanent magnets 15, 15a are opposed on the outer perpheries of the rotary members 6, 7 to magnetize with one another. Suitable pressure is imposed on the bearings 8a, 8b by the action of the permanent magnets 15, 15a, to prevent the rod lenses 9, 9a from tilting and the alignment of the optical axis from being disarranged. In FIG. 5(b), a permanent magnet 15a is provided on the rotary member 7 which is shaped to encase the outer periphery of the rotary member 6. A permanent magnet 15 is attached on the outer circumference of the rotary member 6. The repulsive force of the permanent magnets 15, 15a will impart the bearings 8a, 8b with suitable pressure. The remaining construction is identical with the embodiment shown in FIG. 3(a), but it may be constructed as the one shown in FIG. 3(b).

Figure 6A:
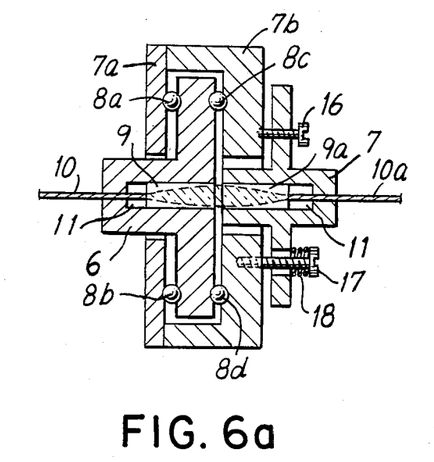
Figure 6B:
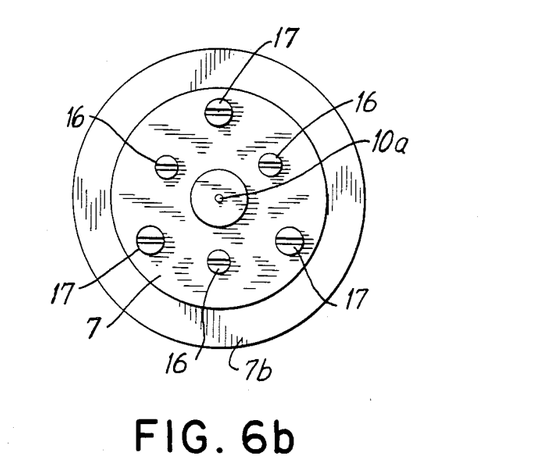
FIG. 6(b) is a side view.

The embodiment shown in FIGS. 6(a) and (b) is provided with a micro-adjustment mechanism to minutely adjust the angle of the rod lenses 9, 9a in order to align the optical axis.

Figure 6C:
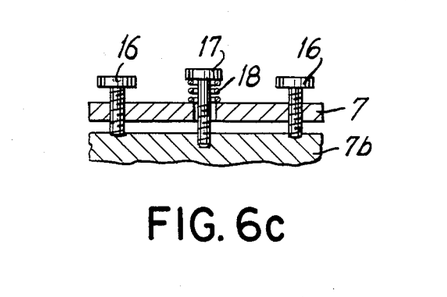
FIG. 6(c) is a sectional view at the center of the angle adjustment mechanism.

According to the embodiment, the rotary member 7 is divided into a portion 7 where the rod lens 9a and the angle adjusting mechanism are provided, another portion 7b which encases the rotary member 6, and a cover plate 7a. 3 micro-adjustment bolts 16 are screwed to the rotary member 7 on the circumference at an interval, and the tip thereof respectively abuts the supporting portion 7b. By varying the degree of protrusion of the bolts 16, the angle of the rotary member 7 is adjusted. 3 bolts 17 are provided on the circumference of the rotary member 7 at an equal interval to penetrate the rotary member 7 and screw with the supporting portion 7b to securely engage the two. Coil springs 18 are interposed between the bolts 17 and the rotary member 7. As shown in FIG. 6(c), the bolts 17 are screwed so that the rotary member 7 and the supporting portion 7b are pressed together. Then, by adjusting the micro-adjustment bolts 16 for the degree of protrusion, the angle of the rod lens 9a at the end section attached to the rotary member 7 is micro-adjusted to align the optical axes. The remaining construction is identical with the embodiment shown in FIG. 3(a), but it may be consutructed as the one shown in FIG. 3(b), in which case the present invention will be extremely effective as the angle of the rod lenses 9, 9a often needs adjsutment.

In the embodiments described herein aoove, the rod lenses were opposed on the rotary axis so that the optical axis where the light rays travel from one rotary member to the other should align with the rotary axis of these two rotary members. This will restrict the direction to which the optical fibers attached to the end section of the rod lenses are drawn out.

In order to overcome the above, still another rotary joint for optical fibers has been conceived.

Figure 7:
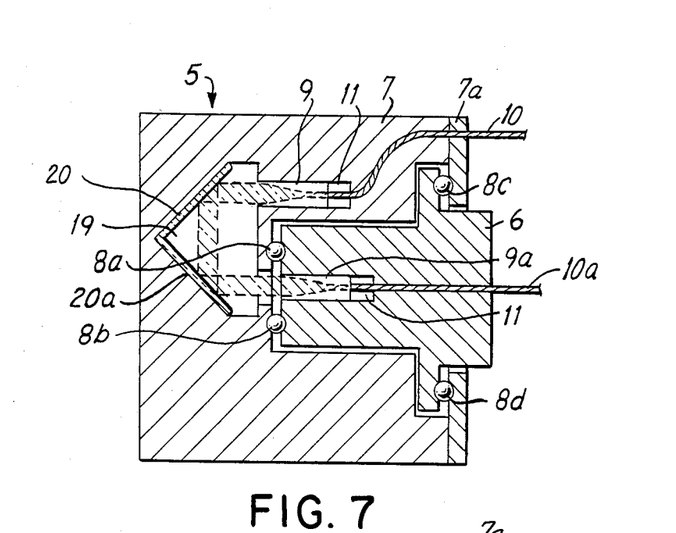
FIG. 7 is a section viewed at the center.

In the embodiment shown in FIG. 7, the rotary member 6 opposing to the rotary member 7 is encased by the rotary member 7 and its cover plate 7a. The bearings 8a–8d are interposed between the rotary members 6 and 7 to retain them relatively rotatable. A dent 19 is made inside the rotary member 7 to house the optical system consisted of two rod lenses 9, 9a and two reflective mirrors 20, 20a. The rotary member 7 is provided with the rod lens 9 of the optical system whose end section is directed to the dent 19 and to its base section is attached the optical fiber 10. The light rays emitted from the rod lens 9 are directed toward the rod lens 9 mounted on the other rotary member 6, which constitutes the optical system, by means of the reflective mirrors 20, 20a, which also constitute the optical system, provided in the dent 19. The rays reflected by the mirror 20a are made to enter the rod lens 9a fixed coaxially with the rotary axis of the rotary member 6. Another optical fiber 10a is connected at the base section of the rod lens 9a, and the optical fibers 10, 10a are arranged in parallel. In the embodiment of FIG. 7, the optical fibers 10, 10a are connected to the base section of the rod lenses 9, 9a on the center axes thereof, which are in parallel, and the reflective mirrors 20, 20a are arranged to form an angle of 45° with each other. However, when the optical fiber is so connected to deviate from the center axis of the rod lens at its light incident section by $X_i$, as shown in FIG. 2(c), the light will be diverged into parallel rays at an angle of $\theta_o$ at the excident end section. The reflective mirrors 20, 20a must be arranged with due consideration of the angle $\theta_o$ in order that the optical axis of the light rays reflected by the mirror 20a to enter into the rod lens 9a should be aligned with the rotary axis of the rotary members 6, 7.

It is not limited to reflective mirrors but any optical means such as prism may be used to constitute the optical system, provided it is capable of transmitting the light from one rod lens to the other.

As the optical system is provided between the rod lenses 9 and 9a, the position of the rod lens 9 is made arbitrary. The optical fiber 10 connected to the base section of the rod lens 9 can also be drawn out in any arbitrary direction. Thus, the rotary joint of this construction has wider application for optical fibers. As has been described above, the rod lenses 9, 9a has the refractive index in the second order distribution against the center axis and its length l is given as $$\frac{\pi}{2\sqrt{a}}.$$

The light emitted from the optical fiber 10a will therefore be diverged into parallel light rays at the excldent end section of the rod lens 9a, reflected by the mirrors 20, 20a and converged by the rod lens 9 to enter the optical fiber 10. Likewise, the light emitted from the optical fiber 10 will be led to the optical fiber 10a. As the optical axis of the parallel rays travelling from one rotary member 6 to the other member 7 is aligned with the rotary axis of the rotary members 6, 7, the light can be efficiently transmitted even if the rotary members are rotated relatively (generally, the rotary member 7 is fixed while the rotary member 6 is made rotatable).

A rod lens about 1 mm in diameter and 10 mm or less in length can be used as the rod lenses 9, 9a, and the rotary joint for optical fibers can thereby be made compact and light weight.

Figure 8:
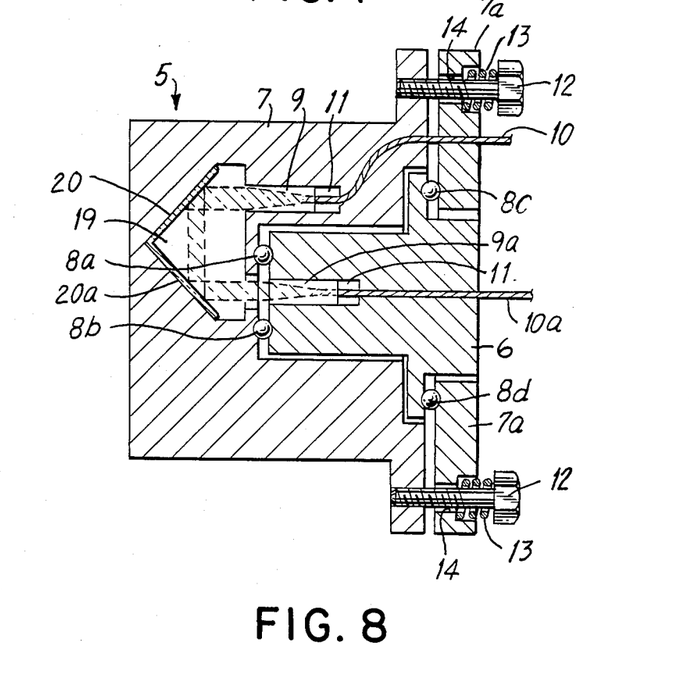

FIG. 8 shows another embodiment according to the present invention as a sectional view at the center.

In this embdiment, the end sections of the rod lenses 9, 9a are prevented from tilting and the light is transmitted between the rotary members 6, 7 with their axes aligned by means of the reflective mirrors 20, 20a. It is provided with an adjustment mechanism, as in the embodiment of FIG. 4, to adjust the pressure imposed on the bearings 8a–8d so as to press the rotary member 7 and the cover plate 7a, the mechanism comprising bolts 12 and coil springs 13. That is, 4 bolts 12 are provided circumferentially at an equal interval to be screwed with the rotary member 7. A clearance 14 is made between the rotary member and its cover plate 7a which is made movable along the bolt 12. A coil spring 13 is interposed between the bolt 12 and the cover plate 7a, and suitable pressure will be imparted to the bearings 8a–8d by the spring. The remaining construction is identical with the embodiment shown in FIG. 7, but it may be constructed using the rod lens shown in FIG. 2(c). The number of the bolts and the coil springs is not restricted to 4.

Figure 9A:
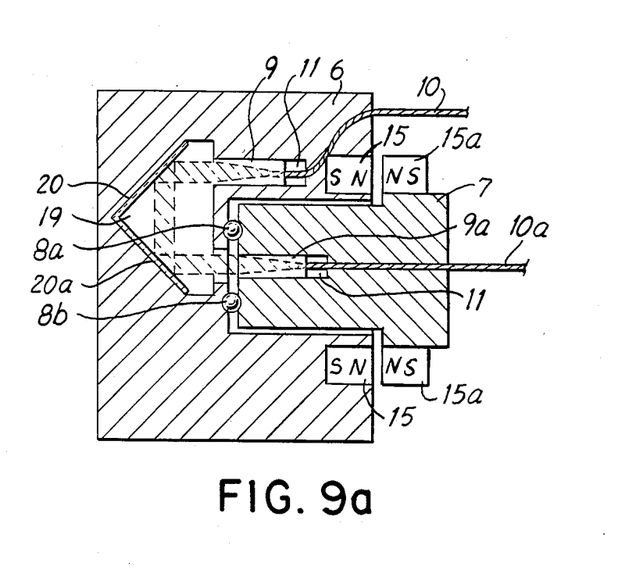
Figure 9B:
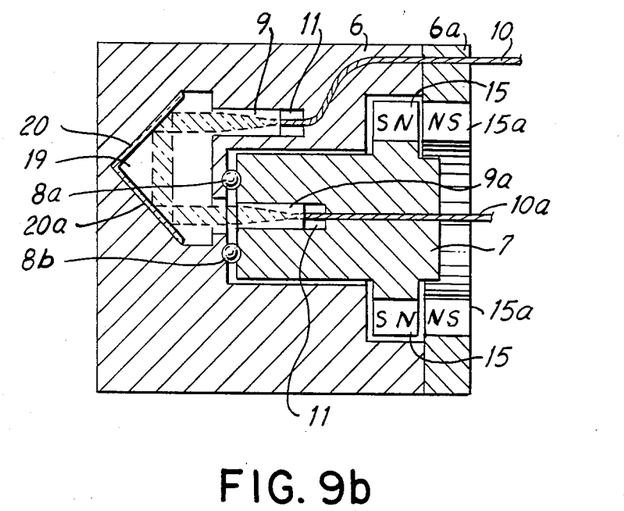

Referring now to FIGS. 9(a) and 9(b), still another embodiment is explained. In this embodiment, like the one shown in FIG. 8, permanent magnets 15, 15a are provided to apply suitable pressure on the bearings 8a, 8b so that the optical axes of rays transmitted between the rotary members 6, 7 via the reflective mirrors 20, 20a will not be disarranged by the tilt on the end sections of the rod lenses 9, 9a. The embodiment in FIG. 9(a) is provided with the circular permanent magnets 15, 15a in an opposite arrangement on the outer circumference of the rotary members 6, 7 to magnetize each other. The permanent magnets 15, 15a will impart suitable pressure to the bearings 8a–8d, to prevent tilting of the rod lenses as well as deviation of the optical axis of the rays transmitted via the reflective mirrors 20, 20a. In the embodiment shown in FIG. 9(b), the permanent magnet 15a is provided on the rotary member 7 which is made to surround the outer circumference of the rotary member 6, where another permanent magnet 15 is attached. By the repulsive force of the permanent magnets 15, 15a, the bearings 8a, 8b are imposed with suitable pressure. The remaining construction is identical with the embodiment shown in FIG. 7, but it may be constructed using the rod lenses shown in FIG. 2(c).

Figure 10:
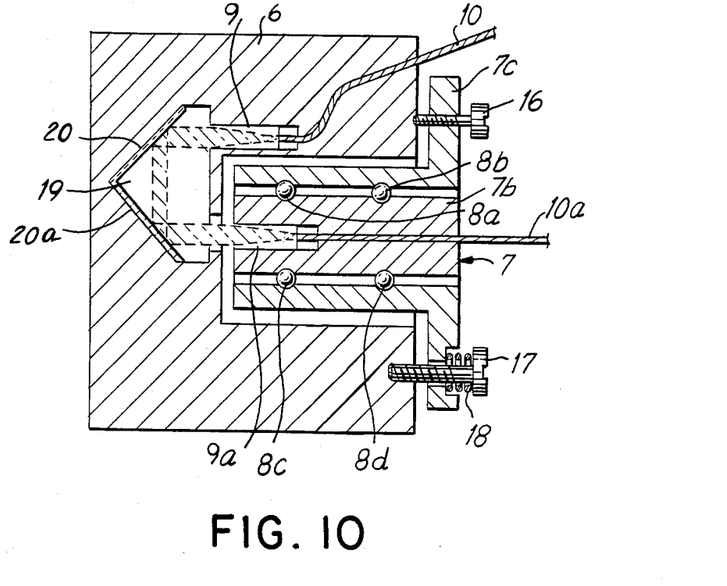

In the embodiment shown in FIG. 10, the angle of the rod lens 9a is made adjustable and a micro-adjustment mechanism is provided to align the optical axis of the light rays transmitted with the rotary axis of the rotary members 6, 7 where the light is transmitted. The rotary member 7 fixed with the rod lens 9a is supported by a sleeve 7b having a flange 7c, to which the angle adjusting mechanims is provided. The angle adjusting mechanism is identical with the one shown in FIG. 6(c). 3 bolts 16 for micro-adjustment are circumferentially screwed at an equal interval on the flange 7c, and the tips thereof are made to abut the side of the rotary member 6. By varying the degree of protrusion of the three bolts 16 respectively, the rotary axis of the rotary member 7 can be adjusted together with the sleeve 7b. 3 bolts 7 are provided at an equal interval between adjacent bolts 16 to secure the support of the sleeve 7b and the rotary member 6, the bolt 17 penetrating the flange 7c to be screwed to the rotary member 6, and the coil spring 18 is interposed between the bolt 17 and the flange 7c and imparted with resilience so that the sleeve 7b is pressed against the rotary member 6.

Therefore, as shown in FIG. 6(c), by imparting suitable resilience by the bolt 17 and by varying the degree of protrusion of the micro-adjusting bolt 16, the angle of the rod lens at the end section is adjusted. The remaining construction is substantially identical with the embodiment shown in FIG. 7 but the rod lenses shown in FIG. 2(c) may also be used.

As an example of practical use of the rotary joint for optical fibers described hereinabove referring to embodiments, description will now be made on the winding drum for the composite cable which controls the machine for underwater operations.

Figure 11:
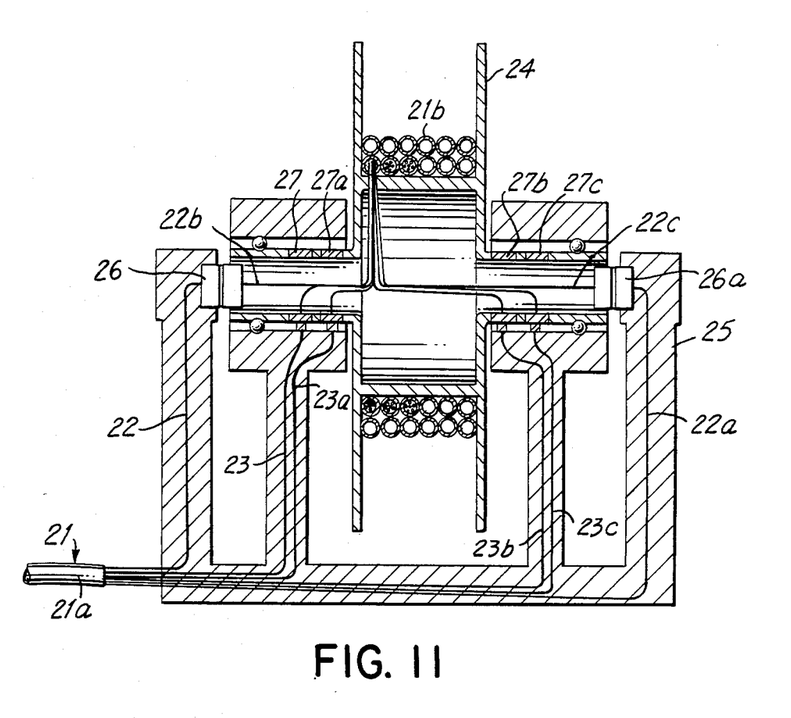
FIG. 11 is a sectional view at the center of a winding drum for composite cables.

The composite cable 21 shown in FIG. 11 is provided wit two optical fibers 22, 22a and 4 power transmission lines 23, 23a, 23b and 23c. The composite cable 21a on the side of the mother ship is removed of its cladding and separated into each cables at the inlet port of the support frame 25 for the winding drum 24. The optical fibers 22, 22a are provided with one of the rotary members coaxially with the winding drum 24. The other rotary member is connected to the optical fibers 22b, 22c at the base of the composite cable 21b to be placed underwater and wound by the winding drum 24 via the rotary joint for optical fibers 26, 26a fixed to the support frame 25. The power transmission lines 23, 23a, 23b and 23c are also combined in the conventional manner via 4 slip rings 27, 27a, 27b, and 27c for power transmission.

As the composite cable on the mother ship side is connected with the composite cable of the underwater side by means of the rotary joint for optical fibers and the slip rings for power transmission, the composite cable of the water side can be fed out or drawn in while the composite cable on the mother ship is fixed. The optical signals transmitted by means of the optical fibers on such an occasion can be transmitted as they are by the use of the rotary joint for optical fibers, and advantages of the optical transmission system can be fully utilized. The optical system provided in the rotary joint enables the optical fibers to be drawn out in any direction.

As has been described above, the present invention can offer a rotary joint for optical fibers of higher transmission efficiency by the use of the rod lenses. There will be no need to convert the optical signals into electric signals before transmitting to the slip ring, as has heretofore been required, and the advantages of the optical transmission system using optical fibers can be fully realized.

What is claimed is:

1. A rotary joint for two optical fibers, each optical fiber having a tip and center axis, rod lenses fixed to the tips of the fibers, said rod lenses each having an optical axis and a refractive index which varies in the radial direction, normal to a central axis of the lens, with a variation proportional to the square of the radius and proportional to a constant "a" wherein the length of the lens is equal to $\pi/(2\sqrt{a})$; two rotary members respectively having connected thereto said two rod lenses, a mechanism for imparting pressure to said rotary members to maintain said optical axes of said two rod lenses in alignment, and a mechanism for finely setting the angle between said two rod lenses, said mechanism being provided on at least one of said rotary members in order to cause parallel rays to be transmitted from one rod lens to the other rod lens such that one said rays coincides with the rotary axis of the respective rotary member and maintains angular settings of end faces of said lenses relative to said parallel rays during relative rotation between said two rotary members, thereby decreasing sensitivity of optical transmission to any displacement of the lenses from said axis.

2. A rotary joint for optical fibers as claimed in claim 1, wherein one of said rotary members is provided with mirror means comprising two mirrors oriented perpendicularly to each other for transmitting by reflection the parallel rays from one rod lens to the other rod lens.

3. A rotary joint for optical fibers as claimed in claim 1, wherein said rotary members are provided with thrust bearings effective in the direction of the center axes of said rod lenses, and wherein said pressure imparting mechanism imparts a predetermined pressure on said thrust bearings.

4. A rotary joint for optical fibers as claimed in claim 3, wherein siad pressure imparting mechanism comprises a pair of permanent magnets.

* * * * *